Aug. 12, 1969  A. C. LODRINI  3,460,356
DEVICE FOR NARROWING DIAMETER OF FINGER RING
Filed Jan. 2, 1968  5 Sheets-Sheet 1
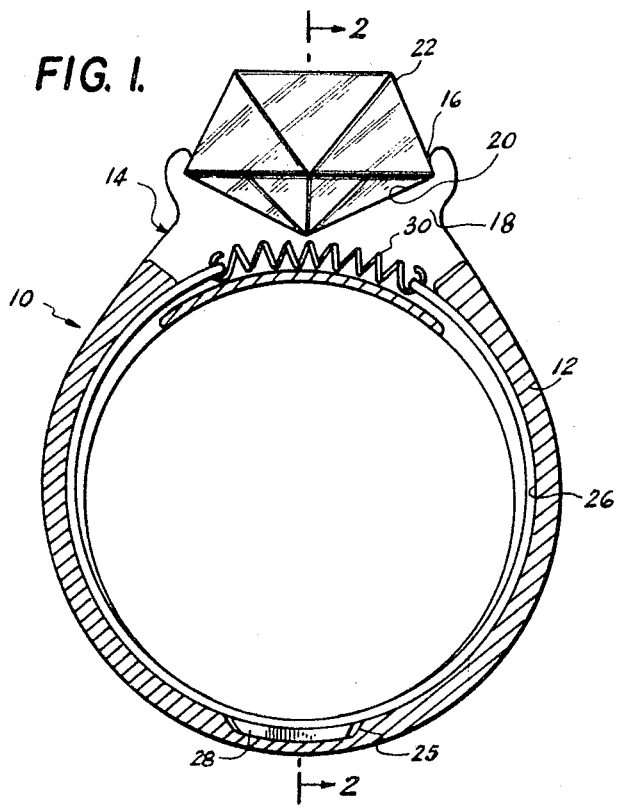
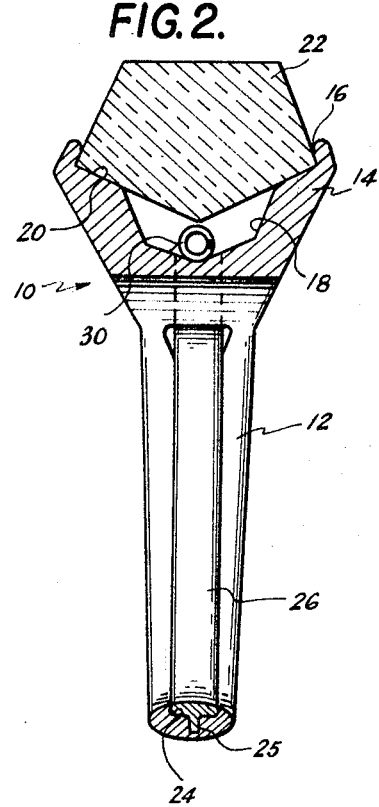
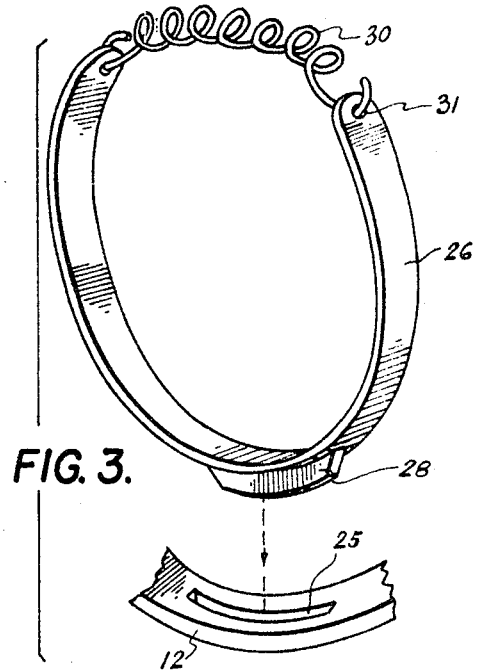
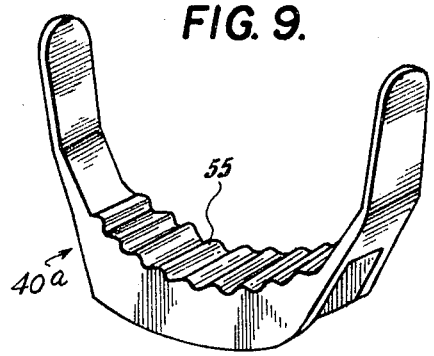
INVENTOR
ALBERT C. LODRINI
BY
Prachek & Saulsbury
ATTORNEYS Aug. 12, 1969  A. C. LODRINI  3,460,356
DEVICE FOR NARROWING DIAMETER OF FINGER RING
Filed Jan. 2, 1968  5 Sheets-Sheet 2
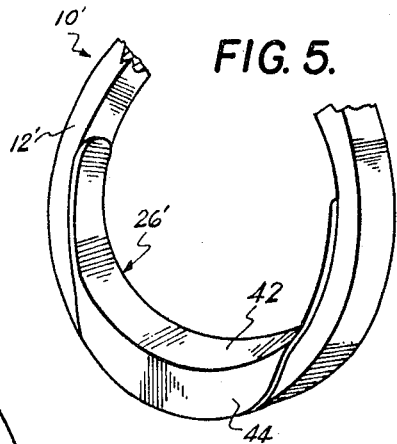
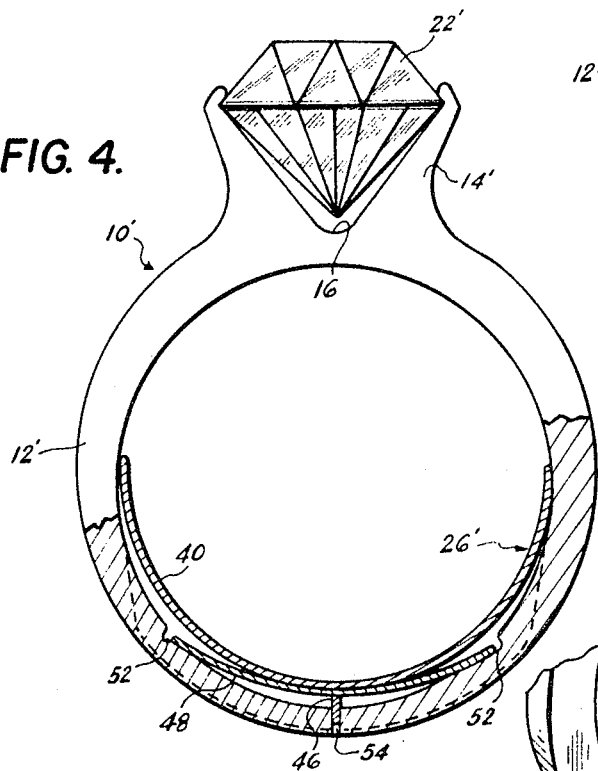
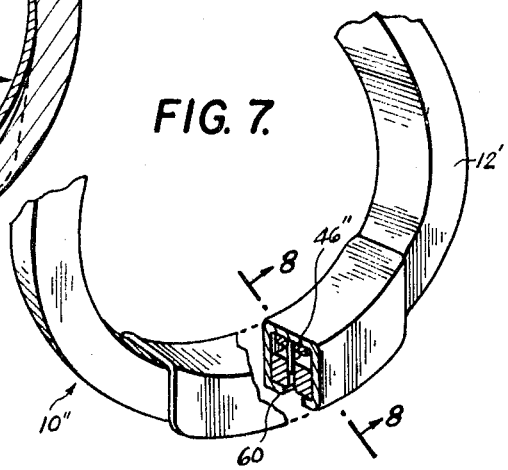
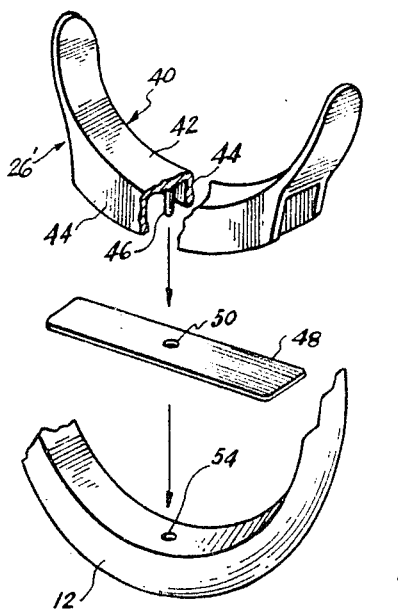
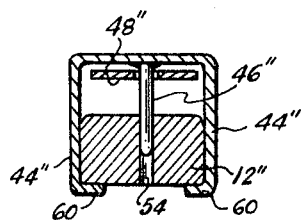
INVENTOR
ALBERT C. LODRINI
BY
Polachek & Saulsbury
ATTORNEYS

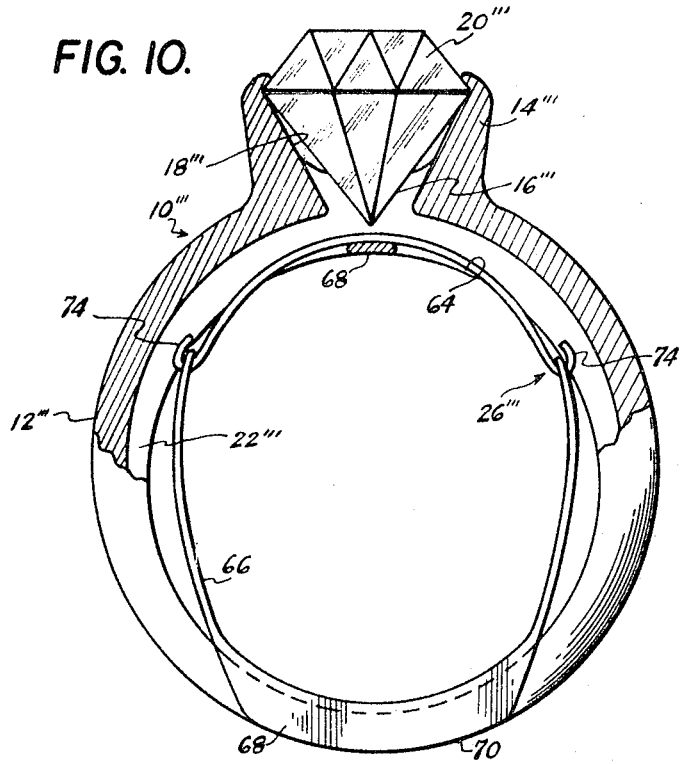
FIG. 10.
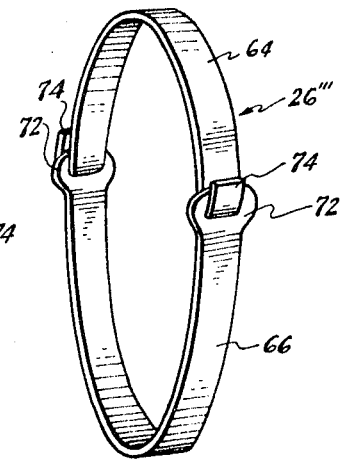
FIG. 11.
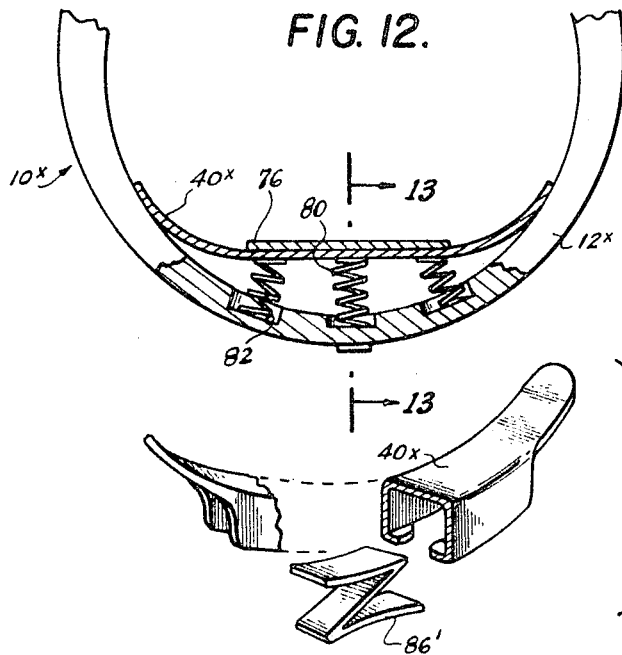
FIG. 12.
FIG. 15.
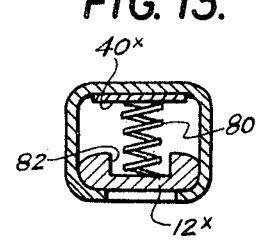
FIG. 14.
FIG. 13.
INVENTOR
ALBERT C. LODRINI
BY
Polachek & Saulsbury
ATTORNEYS Aug. 12, 1969     A. C. LODRINI     3,460,356
DEVICE FOR NARROWING DIAMETER OF FINGER RING
Filed Jan. 2, 1968     5 Sheets-Sheet 4

INVENTOR
ALBERT C. LODRINI

BY Polachek & Saulsbury

ATTORNEYS

Aug. 12, 1969      A. C. LODRINI      3,460,356
DEVICE FOR NARROWING DIAMETER OF FINGER RING
Filed Jan. 2, 1968                    5 Sheets-Sheet 5
FIG. 19.
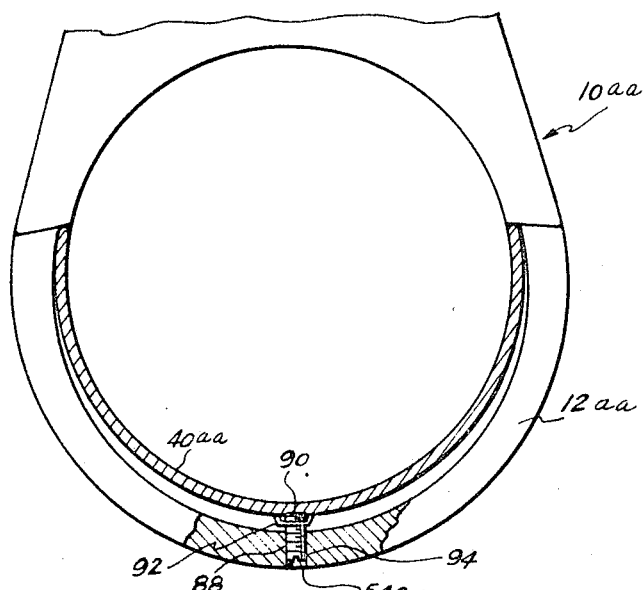
FIG. 20.
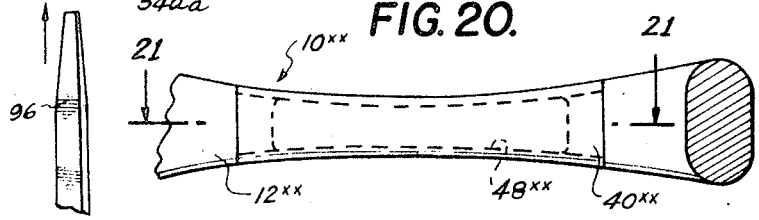
FIG. 21.
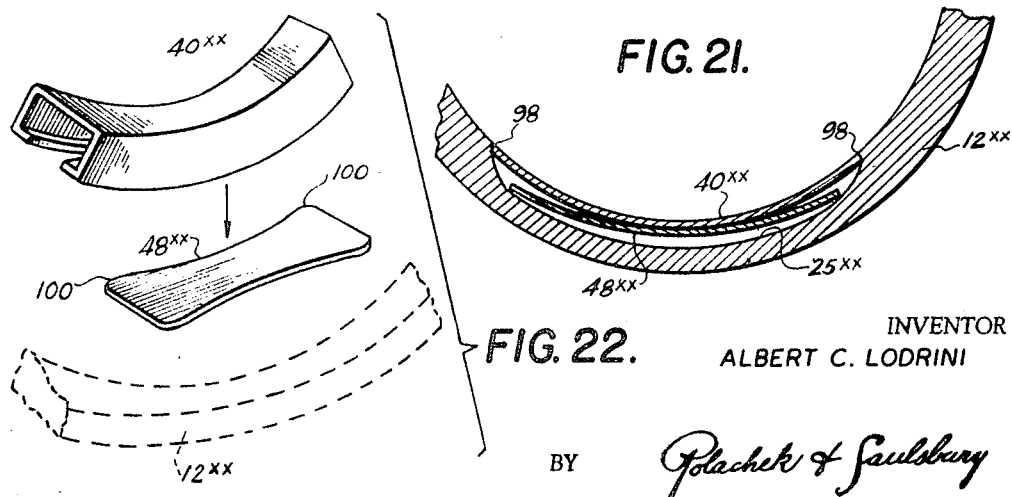
FIG. 22.
INVENTOR
ALBERT C. LODRINI
BY Polachek & Saulsbury
ATTORNEYS

United States Patent Office 3,460,356
Patented Aug. 12, 1969

3,460,356
DEVICE FOR NARROWING DIAMETER
OF FINGER RING
Albert C. Lodrini, 697 Hillcrest Road,
Westwood, N.J. 07675
Continuation-in-part of application Ser. No. 673,323,
Oct. 6, 1967. This application Jan. 2, 1968, Ser.
No. 695,120
Int. Cl. A44c 9/02, 9/00
U.S. Cl. 63—15.6                                     4 Claims

ABSTRACT OF THE DISCLOSURE

A finger ring having a device for readily narrowing the diameter of the band of the ring. The device includes a split auxiliary band embedded in a groove in the inner periphery of the main band of the ring. The split ends of the auxiliary band are connected by a flexible member which automatically draws the auxiliary band around the finger of the wearer of the band. The auxiliary band may take the form of a saddle member with a spring plate for urging the saddle member against the finger of the wearer of the ring.

---

This invention relates to new and useful improvements in finger rings and more particularly to a finger ring having an auxiliary band for preventing displacement of the ring on the finger, and this application is a continuation-in-part of my copending application Ser. No. 673,323, filed Oct. 6, 1967.

An important object of the present invention is to provide a finger ring with a device for readily narowing the diameter of the inner periphery of the band of the ring.

Another object of the invention is to provide the main band of the finger ring with an auxiliary band on the inner surface of the main band with means for narrowing the diameter of said auxiliary band.

BRIEF DESCRIPTION OF THE VIEW OF THE DRAWINGS

FIGURE 1 is a phantom side view of a finger ring embodying one form of the invention, showing the position of the auxiliary band in full lines on the main band.

FIG. 2 is a vertical sectional view taken on line 2—2 of FIG. 1.

FIG. 3 is a perspective view of the auxiliary band and a portion of the main band.

FIG. 4 is a side elevational view of a finger ring embodying a first modification of the invention, parts being shown in section.

FIG. 5 is a fragmentary perspective view showing the auxiliary band in position.

FIG. 6 is a spread perspective view of the auxiliary band, plate and a fragment of the main band.

FIG. 7 is a fragmentary perspective view of a finger ring embodying a second modification of the invention.

FIG. 8 is a vertical sectional view taken on line 8—8 of FIG. 7.

FIG. 9 is a perspective view of an auxiliary band having a serrated grip surface.

FIG. 10 is a view similar to FIG. 1 of a third modification of the invention.

FIG. 11 is a perspective view of an auxiliary band therefor.

FIG. 12 is a fragmentary part elevational and part sectional view of a finger ring embodying a fourth modification of the invention.

FIG. 13 is a vertical sectional view taken on line 13—13 of FIG. 12.

FIG. 14 is a top perspective view of a modified form of spring member.

FIG. 15 is a disassembled perspective view of an auxiliary band with still another modified form of spring member.

FIG. 19 is a view similar to FIG. 1 of a fragment of a finger ring embodying a seventh modification of the invention, a tool being shown in operative position.

FIG. 20 is a top view of the bottom portion of the main band of a finger ring embodying an eighth modification of the invention.

FIG. 21 is a sectional view taken on the plane of the line 21—21 of FIG. 20.

FIG. 22 is a spread perspective view of the parts of FIG. 20.

DETAILED DESCRIPTION OF THE DRAWINGS

Figure 16:
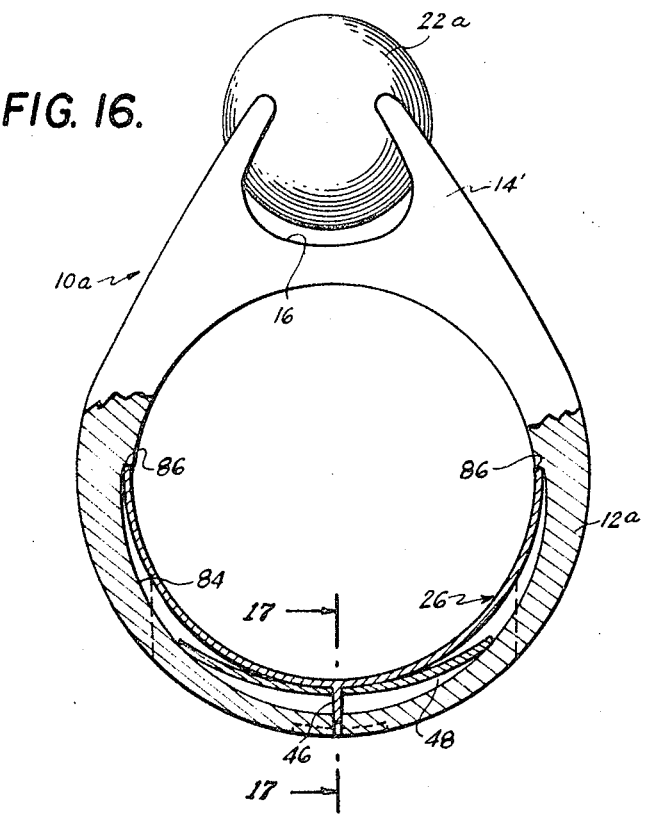
FIG. 16 is a view similar to FIG. 1 of a finger ring embodying a fifth modification of the invention.

Referring now in detail to the various views of the drawings, in FIG. 1 a finger ring made in accordance with one form of the invention is shown and designated generally at 10. The ring 10 has a circular solid main band 12 with an enlarged head portion 14 at the top as viewed in FIG. 1. The head portion 14 is formed with a recess 16 and the recess is formed with a countersunk recess 18. Opposed slanting shoulders 20, 20 are formed in the recess 16 intermediate its top and bottom, serving as a seat for supporting a diamond or stone 22 in exposed position. The inner periphery of the band 12, from the ends of the countersunk recess therearound is formed with a central groove 24 therealong. The groove is rectangular in crosssection for the major portion of its length, and is formed with a short arcuate-shaped countersunk groove 25, along the bottom portion of the band 12. The countersunk recess 18 communicates with the ends of the groove 24 as best seen in FIG. 1.

In accordance with the invention, an auxiliary split spring metal band 26 narrower than the main band 12 is embedded in the groove 24. The auxiliary band is formed with a short arcuate shaped flange 28 along its bottom portion as viewed in FIG. 1, at its center, to permit the flange 28 to fit in the countersunk groove 25 and to limit the rotational movement of the auxiliary band within the groove and relative to the main band. The auxiliary band 26 is self-adjusting by means of a tension spring 30, interposed between the free ends of the auxiliary band, with the ends of the spring anchored in holes 31 formed in the ends of the auxiliary band. The top of the auxiliary band and tension spring 30 are positioned in the countersunk recess 18.

In use, when the main band 12 is slipped over the finger of the wearer, the spring 30 will permit automatic expansion of the auxiliary band 26 to adjust its diameter to the diameter of the finger of the wearer, thereby holding the ring on the finger against displacement.

In FIGS. 4 to 6, inclusive, a finger ring 10' embodying a first modification of the invention is shown. The ring 10' has a main band 12' with enlarged head portion 14' at the top, the head being formed with a recess 16' therein to support a diamond or stone 22'.

In this form of the invention, the auxiliary band 26' is constituted by an arcuate-shaped saddle member 40 having a curved body 42 with depending flanges 44, 44 along the edges thereof. A pin 46 depends from the body midway its ends being hidden from view by the flanges 44, 44. An elongated, perforated spring metal plate or leaf 48 is mounted on the pin, the pin extending through the perforation 50 in the plate, positioning the plate between the flanges 44 of the saddle member. The main band 12' along its bottom portion is reduced in thickness forming shoulders 52, 52 in the inner surface thereof. The plate 48 seats on this reduced portion when in operative position on the pin 46 and urges the saddle member 40 inwardly, the pin 46 projecting through a hole 54 formed in the bottom portion of the main band 12'.

In use, the spring plate 48 urges the auxiliary band 26' inwardly against the finger and the finger of the wearer reacts by pushing the pin 46 through the hole 54 in the band 12'.

In place of the saddle 40, a modified form of saddle 40a as shown in FIG. 9 may be used. The saddle 40a differs from the saddle 40 merely in that the upper surface of the body thereof is formed with corrugations 55 for engaging the skin of the finger of the wearer to aid in holding the ring on the finger and also to allow free circulation of the blood in the finger.

In FIGS. 7 and 8, a finger ring 10" embodying a second modification of the invention is illustrated. The ring 10" differs from the ring 10' of FIGS. 4 to 7, inclusive, in that the side flanges 44' have their long free edges turned in forming flanges 56 for holding the saddle 26' in position. The saddle 26' is channel-shaped with no end extensions.

A finger ring 10''' embodying a third modified form of the invention is shown in FIGS. 10 and 11. The ring 10''' has a circular solid band 12''' with an enlarged head portion 14''' at the top. The head portion is formed with an opening constituting a chamber 16'''. The opening extends through the head portion from top to bottom thereof. A slanting side wall 18''' serves as a seat for supporting a diamond or stone 20''' in exposed position. The inner periphery of the band 12''' from the ends of the chamber 16''' is formed with a central groove 22''' therearound.

In accordance with this form of the invention, an auxiliary sectional metal band 26''' narrower than the band 12''' and having an upper section 64 and a lower section 66 as viewed in FIG. 10 is partly embedded in the groove 22'''. The upper section 64 which is positioned in the groove seats on a cross piece 68 formed on the main band 12'''. The lower section 66 is formed with depending flanges 68, 68 at the bottom portion thereof, the flanges terminating in inwardly extending flanges 70, 70 gripping the band 12''' to hold the auxiliary band 26''' in place. The upper and lower sections 64 and 66, respectively are connected to each other by means of slotted eyes 72 formed on the top ends of the bottom section 66 receiving bent end portions 74 on the bottom ends of the upper section 64.

In use, the lower section 66 tends to spread out thereby gripping the finger of the wearer.

In FIGS. 12 and 13, a finger ring 10x embodying a fourth modified form of the invention is shown. Ring 10x differs from ring 10' of FIG. 4 in that a spring plate 76 is seated on the body of the saddle 40x. A plurality of coiled springs 80 are seated in circular grooves 82 formed in the surface of the main band 12x at its bottom portion and impinge against the saddle 40x urging the spring plate 76 against the finger of the wearer.

The spring 80 of FIG. 12 may be replaced by a flat compound curved spring plate 84 as shown in FIG. 14, or by a Z-shaped spring 86' as shown in FIG. 15.

Figure 17:
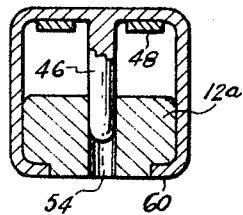
FIG. 17 is a vertical sectional view taken on the plane of the line 17—17 of FIG. 16.
Figure 18:
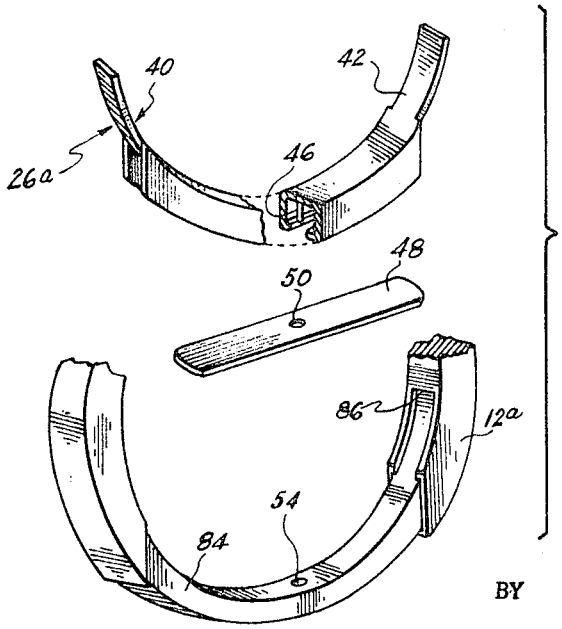
FIG. 18 is a spread perspective view of the parts of FIG. 16.

Another finger ring 10a embodying a fifth modified form of the invention is shown in FIGS. 16 to 18, inclusive. The ring 10a differs from the ring 10' of FIG. 4 merely in that the bottom portion of the main band 12a is reduced in diameter as indicated at 84 providing opposed shoulders 86. The saddle 26a is channel-shaped fitting over the reduced portion 84 with its ends seated against the shoulders 86.

Furthermore, the stone 22a is spherical.

In all other respects, the ring 10a is similar to ring 10' and similar reference numerals are used to indicate similar parts.

FIG. 19 illustrates a finger ring 10aa with a sixth modification of the invention, differing from the finger ring 10a of FIG. 16 in that no spring plate such as plate 48 is used and in place of an integral pin, such as pin 46, a slotted screw 88 with rounded end 90 is threaded into a threaded bearing 92 formed on the bottom surface of the body of the saddle 40aa which screw is adapted to extend through the hole 54aa in the main band 12aa. The slot 94 of the screw is adapted to receive a turning tool 96 for mounting and demounting the screw.

In FIGS. 20 to 22, inclusive, a fragment of a finger ring 10xx is shown embodying a seventh modification of the invention. Only the bottom portion of the main band 12xx is shown which portion is narrowed out toward its center and is provided with a curved groove 25xx, with end shoulders 98. The channel-shaped saddle 40xx fits in the groove 25xx with its ends seated on the shoulders 98. A spring plate 48xx with flaring ends 100 is interposed between the body of the saddle and the base of the groove 25xx for urging the saddle against the finger of the wearer.

I claim:

1. A finger ring comprising a circular main band, an enlarged open head portion at the top of the band with a cross piece lying therebetween, a split spring auxiliary band carried by the main band on the inner periphery thereof with the split ends lying adjacent to the head portion, and spring means in the head portion and supported on said cross piece and extending between the split ends of the auxiliary band for narrowing the diameter of the auxiliary split band to frictionally engage the finger of the wearer to prevent displacement of the ring on the finger.

2. A finger ring as defined in claim 1 wherein the main band is formed with a groove along the inner periphery thereof, said auxiliary band being embedded in said groove for the major portion of its length, said main band having a short countersunk groove in the bottom portion thereof and said auxiliary band having flange depending into said countersunk groove to prevent rotational movement of the auxiliary band within the groove and relative to the main band.

3. A finger ring as defined in claim 1, said main band is formed with a groove along the inner periphery thereof and said auxiliary band being embedded in said groove for the major portion of its length, the ends of the split auxiliary band having holes therein, said tension spring means for narrowing the diameter of the split band including a coiled tension spring with the ends thereof looped in the holes in the ends of the split in the split band.

4. A finger ring as defined in claim 1 wherein the auxiliary band is sectional including a top section and a bottom section, said top section extending over the cross piece in the open head portion of the main band and serving as said spring means, the sections being connected at their ends by a slot and loop connection, the bottom section having flanges extending along the sides of the bottom portion of the main band, and inturned flanges on said side flanges for hooking the bottom section to the bottom portion of the main band.

References Cited

UNITED STATES PATENTS

| 783,198 | 2/1905 | Hayes | 63—15.6 |
| 1,115,764 | 11/1914 | Applas | 63—15.6 |
| 2,761,294 | 9/1956 | Lund | 63—15.6 |

FOREIGN PATENTS

| 230,695 | 3/1925 | Great Britain. |
| 650,768 | 2/1962 | Canada. |

ROBERT PESHOCK, Primary Examiner